(12) United States Patent
Furukawa

(10) Patent No.: US 8,074,702 B2
(45) Date of Patent: Dec. 13, 2011

(54) COOLING SYSTEM FOR FORMING MOLD AND METHOD OF COOLING FORMING MOLD

(75) Inventor: Yuichi Furukawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 373 days.

(21) Appl. No.: 12/374,601

(22) PCT Filed: May 30, 2007

(86) PCT No.: PCT/JP2007/061408
§ 371 (c)(1), (2), (4) Date: Mar. 2, 2009

(87) PCT Pub. No.: WO2008/012994
PCT Pub. Date: Jan. 31, 2008

(65) Prior Publication Data
US 2009/0315231 A1    Dec. 24, 2009

(30) Foreign Application Priority Data

Jul. 26, 2006  (JP) .................................. 2006-204009

(51) Int. Cl.
*B22D 27/04* (2006.01)
*C21B 7/10* (2006.01)
*B22D 41/005* (2006.01)

(52) U.S. Cl. ........................................ 164/348; 266/46

(58) Field of Classification Search .................. 164/348; 266/46
See application file for complete search history.

(56) References Cited

FOREIGN PATENT DOCUMENTS

| JP | 63-004085 | | 1/1988 |
|---|---|---|---|
| JP | 63-299848 | A | 12/1988 |
| JP | 07-001458 | A | 1/1995 |
| JP | 10-109092 | A | 4/1998 |
| JP | 11-170257 | A | 6/1999 |
| JP | 2003-103619 | A | 4/2003 |
| JP | 2005-254595 | A | 9/2005 |
| JP | 2006150395 | * | 6/2006 |

* cited by examiner

*Primary Examiner* — Jessica L Ward
*Assistant Examiner* — Alexander Polyansky
(74) *Attorney, Agent, or Firm* — Kenyon & Kenyon LLP

(57) ABSTRACT

In a forming mold equipped with a cooling channel for circulation of a refrigerant composed of a cooling gas and a atomized cooling liquid, any increase of back pressure attributed to evaporation of the refrigerant fed to the cooling channel is inhibited to thereby attain cooling acceleration, and further any occurrence of rust or scale by the refrigerant circulated through the cooling channel is prevented. Accordingly, a channel for supply of the refrigerant to the cooling channel of the forming mold is provided with air pressure source for trapping of air in the supply channel and pressure feeding of the same; oxygen separation means for separation removal of oxygen from the pressure fed air to thereby lower the oxygen concentration of the air; and atomizing means for spraying of the cooling liquid into the air with oxygen concentration lowered. The oxygen separated from the air by the oxygen separation means is returned to the refrigerant forcedly emitted from the cooling channel by means of forced exhaust means.

4 Claims, 1 Drawing Sheet

COOLING SYSTEM FOR FORMING MOLD AND METHOD OF COOLING FORMING MOLD

This is a 371 national phase application of PCT/JP2007/061408 filed 30 May 2007, claiming priority to Japanese Patent Application No. 2006-204009 filed 26 Jul. 2006, the contents of which are incorporated herein by reference.

TECHNICAL FIELD

The present invention relates to an art for cooling a forming mold.

BACKGROUND ART

It is known that the conventional art for cooling of a forming mold, in which the forming mold includes a cooling channel and an atomized coolant liquid as a refrigerant is flowed with compressed air in the cooling channel (see JP-63-299848A). In this conventional cooling art, the refrigerant consisting of the coolant liquid and the compressed air is flowed into the cooling channel, and the air blow and heat of evaporation of the coolant liquid make the forming mold cool, in which the refrigerant passes through the cooling channel taking heat from surroundings.

It is also known that the conventional cooling for the forming mold, in which a flux of the atomized coolant liquid is controlled for adjustment of cooling (see JP-H11-170257A).

In the both conventional cooling art, the exhaust gas from the cooling channel contains a lot of water vapor. The vapor is emitted around the mold, which causes the heightening of humidity in the factory, so that the working atmosphere lowers. Particularly, with respect to a casting mold, the heightened humidity lowers the quality of molten metal.

The atomized coolant liquid flowed into the cooling channel of the forming mold is rapidly evaporated in the cooling channel and the volume of the coolant liquid is expanded, thereby the back pressure of the cooling channel increases. Due to the increase of back pressure, the boiling point of the coolant liquid is heightened and a part of the refrigerant is liquefied. Further, the turbulence of the coolant occurs and unfortunately the equal cooling is blocked.

Moreover, the cooling channel, into which the refrigerant including atomized coolant liquid and air is flowed, becomes high temperature, thereby the air and iron of the wall of the cooling channel react with water. Thus, there occurs rust that degrades the mold or scale that lowers the cooling efficiency. To avoid the occurrence of the rust at the wall of the cooling channel, it is conventionally known to eliminate dissolved oxygen of the coolant liquid circulated in the cooling channel (see JP-H10-109092 A). However, when the atomized coolant liquid is flowed with the compressed air, the iron of the wall of the cooling channel does not react with the dissolved oxygen in the coolant liquid but with oxygen in the air. Therefore, the elimination of the dissolved oxygen may fail to prevent the rust.

SUMMARY OF INVENTION

The objection of the present invention is to provide a forming mold equipped with a cooling channel through which a refrigerant composed of a cooling gas and an atomized coolant liquid passes, capable of improving the cooling performance by preventing the back pressure from heightening caused of the evaporation of the refrigerant fed to the cooling channel and capable of preventing the occurrence of rust or scale caused of the refrigerant passing through the cooling channel.

A method of cooling a forming mold and a cooling system for a forming mold according to the present invention have features described below.

The first aspect of the present invention is a method of cooling a forming mold provided with a cooling channel, passing a refrigerant including a cooling gas and a coolant liquid therethrough, wherein the cooling gas is employed as an air of which oxygen concentration is lowered and the cooling gas passes through the cooling channel.

The second aspect of the present invention is a method of cooling a forming mold provided with a cooling channel, passing a refrigerant therethrough and a feeding channel, connected to the cooling channel and feeding the refrigerant to the cooling channel, wherein the feeding channel comprises an air pressure source, oxygen separation means and atomizing means. The method comprises pressure feeding an air to the feeding channel by means of the air pressure source, separating oxygen from the fed air and lowering a concentration of the air by means of the oxygen separation means, and atomizing a coolant liquid to the oxygen-concentration-lowered air and flowing them to the cooling channel.

In the second aspect of the present invention, the method preferably includes returning the oxygen separated from the air by means of the oxygen separation means to the refrigerant exhausted from the cooling channel.

Further, the method preferably preparing forced exhaust means in the cooling channel, and exhausting forcedly the refrigerant in the cooling channel by means of the forced exhaust means.

The third aspect of the present invention is a cooling system for a forming mold provided with a cooling channel, passing a refrigerant therethrough, the cooling system comprises an air pressure source for compressing a captured air and for delivering the compressed air to the cooling channel, oxygen separation means for separating and eliminating an oxygen from the compressed air delivered from the air pressure source and for lowering an oxygen concentration of the air and atomizing means for atomizing a coolant liquid to the oxygen-concentration-lowered air.

In the third aspect of the present invention, the cooling channel preferably comprises an exhaust channel, provided with an oxygen returning channel for returning the oxygen separated from the air by means of the oxygen separation means to the refrigerant exhausted from the cooling channel.

Further, the cooling system preferably comprises forced exhaust means for exhausting forcedly the refrigerant in the cooling channel.

The effects of the present invention are described below.

In accordance with the present invention, in a forming mold equipped with a cooling channel through which a refrigerant including a cooling gas and an atomized coolant liquid passes, the refrigerant of which oxygen concentration is lowered is fed to the cooling channel, thereby preventing the occurrence of rust or scale at the wall of the cooling channel caused of the refrigerant passing therethrough.

Further, in accordance with the present invention, in a forming mold equipped with a cooling channel through which a refrigerant including a cooling gas and an atomized coolant liquid passes, the refrigerant in the cooling channel is forcedly exhausted, thereby preventing the increase of the back pressure due to the evaporation of the coolant liquid. Therefore, the evaporation of the coolant liquid is prevented form lowering and the refrigerant passing through the cooling channel is regulated, which results in improving the cooling performance.

Figure 1:
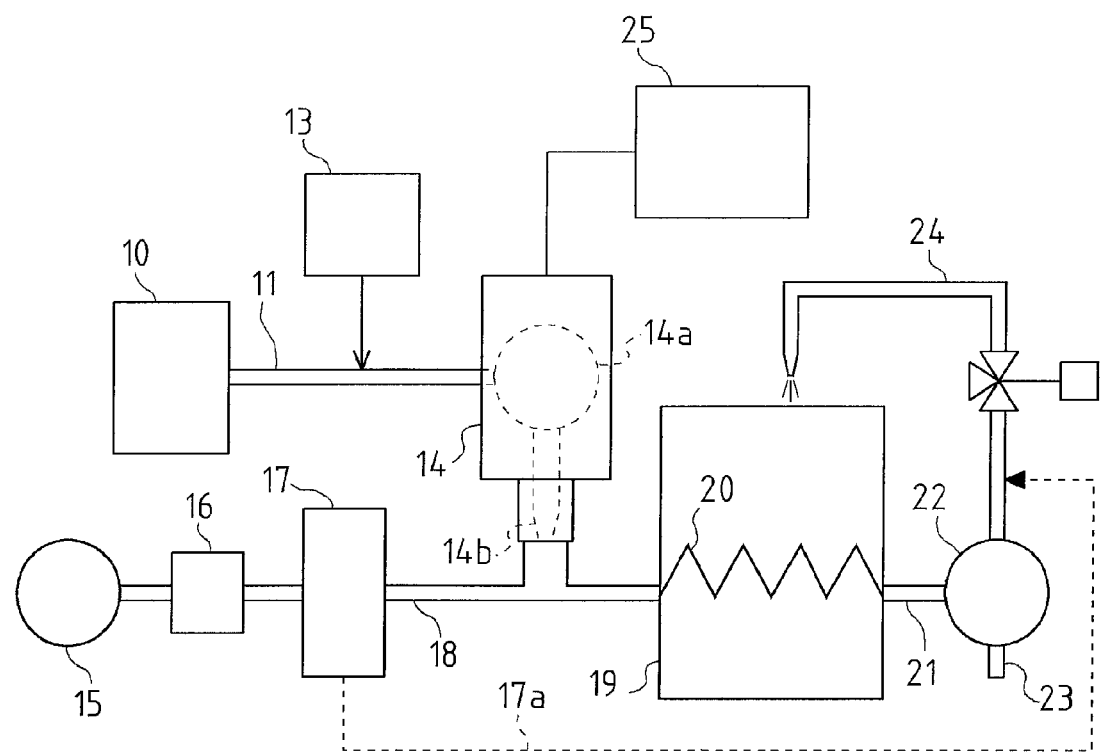
FIG. 1 shows a forming mold provided with a cooling system according to the present invention.

EXPLANATION OF NUMERALS 10 water tank
13 agent feeding means
14 atomizing means
15 air pressure source
17 oxygen separation means
17a oxygen returning means
19 forming mold
20 cooling channel
22 forced exhaust means
23 drain
24 exhaust pipe

THE BEST MODE FOR CARRYING OUT THE INVENTION

Referring FIG. 1, a forming mold 19 will be described below, which is one embodiment of a forming mold provided with a cooling system in accordance with the present invention.

The forming mold 19 provided with the cooling system includes a cooling channel 20 through which a refrigerant for cooling the mold 19 passes.

The refrigerant passing through the cooling channel 20 includes a cooling gas and an atomized coolant liquid (hereinafter called 'atomized water').

The cooling gas is an air of which oxygen concentration is lowered, namely a gas in which the oxygen is eliminated from the air. The atomized water is at least the atomized pure water at the introduction of the cooling channel 20.

The refrigerant is fed to the mold 19 through a liquid-feeding channel 11 and a gas-feeding channel 18.

The liquid-feeding channel 11 includes a water tank 10 for storing the pure water as the coolant liquid and atomizing means 14 for pumping up the coolant liquid stored in the water tank 10, for atomizing the liquid and for blowing the atomized liquid. The atomizing means 14 is, for example, composed of an atomizing nozzle 14b and a pump 14a for pumping up the coolant liquid stored in the water tank 10 and for pressure feeding the coolant liquid to the atomizing nozzle 14b. The atomizing means 14 is not limited above-mentioned structure, and it may be an alternative device having a function to pump up and atomize the coolant liquid in the water tank 10.

The atomizing means 14 includes control means 25 for controlling the blowing rate of the atomized water from the atomizing nozzle 14b.

The control means 25 adjusts the blowing rate of the atomized water so that the including rate of the atomized water in the refrigerant. Due to the control of the volume of the atomized water included in the refrigerant, the temperature of the mold 19 becomes controllably changeable.

The liquid-feeding channel 11 may be provided with agent feeding means 13 for feeding an agent, such as a rust-prevention agent or a cleaner, into the coolant liquid before flowed in the atomizing means 14. The agent feeding means 13 is, for example, a dropping device for feeding a liquid agent to the coolant liquid at a certain volume. The application method of the agent feeding means 13 will be described hereinafter.

The gas-feeding channel 18 includes an air pressure source 15 for compressing the air captured from surrounding and for delivering the compressed air, a filter 16 for removing a contamination (e.g. a dust) from the compressed air delivered from the air pressure source 15, and oxygen separation means 17 to separate and eliminate the oxygen from the compressed air delivered from the air pressure source 15 for lowering the oxygen concentration of the air.

The air pressure source may be composed of an air compressor, which has a function for pressure feeding, that is for compressing the intake air and delivering high-pressure air.

The oxygen separation means 17 may be composed of an oxygen separation membrane which separates oxygen from air. The conventional oxygen separation membrane, such as a porous membrane formed with a thin membrane which only allows oxygen (or oxygen ion) penetration, may be employed as the oxygen separation membrane.

The cooling gas fed through the gas-feeding channel 18 is mixed with the atomized water fed through the liquid-feeding channel 11, blowing the atomized water to the cooling gas. Thus, the refrigerant, including the cooling gas and the atomized water (atomized coolant liquid), is flowed into the cooling channel 20.

The cooling gas composing the refrigerant is an air of which oxygen concentration is lowered, so that oxygen does hardly exist in the cooling gas. Therefore, feeding the refrigerant into the cooling channel does not allow the occurrence the rust and scale of the wall of the cooling channel 20, so that any occurrence of rust or scale is prevented.

If the wall is oxidized, the oxidation occurs in low-oxygen-concentration circumstance, so that dense oxide layer (e.g. $Fe_3O_4$) is formed which improves rust-prevention.

After passing through the cooling channel 20 of the forming mold 19, the refrigerant is exhausted from an exhaust channel 21. The exhaust channel 21 includes forced exhaust means 22 for forcedly exhausting the refrigerant from the cooling channel 20.

The forced exhaust means 22 may be an exhaust pump such as a diaphragm pump, a vacuum pump, blower, or the like.

As mentioned above, the forced exhaust means 22 forcedly exhausts refrigerant of the cooling channel 20, so that it can be prevented that the back pressure of the cooling channel 20 increases when the refrigerant flows thereinto. Further, it can be prevented that evaporation of the coolant liquid in the cooling channel 20 is degraded, so that the cooling performance is maintained. Moreover, in the cooling channel 20, the forced flow of the refrigerant toward the exhaust channel 21 is formed and the refrigerant is regulated, so that the cooling performance is advanced.

The refrigerant exhausted from the cooling channel 20 includes a lot of water vapor, which is liquefied through the forced exhaust means 22. The liquefied vapor is exhausted through a drain 23 of the forced exhaust means 22. The water vapor is not emitted from the cooling channel 20, so that it can be prevented that the working atmosphere and the quality of molten metal caused of rising of the humidity in the factory lower.

The emitted gas from the cooling channel 20 is blown toward the forming mold 19 via an exhaust pipe 24 and is applied to dry the forming mold 19. The exhaust pipe 24 is connected to an oxygen returning channel 17a, which returns the oxygen, which is separated from the air by means of the oxygen separation means 17 of the gas-feeding channel 18, to the refrigerant exhausted from the cooling channel 20.

The gas (refrigerant) flowed into the exhaust pipe 24 from the forced exhaust means 22 lacks oxygen, however the gas emitted from the exhaust pipe 24 is added oxygen, so that the factory atmosphere can be prevented from becoming oxygen deficient atmosphere.

The application method of the agent feeding means 13 is described below.

The agent feeding means 13 is employed as part of the maintenance process for the forming mold 19, that is the rust-prevention process and cleaning process for the wall of the cooling channel 20 provided with the forming mold 19.

The agent feeding means 13 feeds the coolant liquid pumped up by the atomizing means 14 to the agent at a certain volume, which is a rust-prevention agent and/or cleaner.

The cleaner may be a chelating agent. The rust-prevention agent may be an aliphatic acid. Additionally, the coolant liquid mixed with the agent is preferably set in the pH range 6.0-9.5 in order to prevent the zinc or copper composing the forming mold 19 from elution.

The coolant liquid mixed with the agent is blown as the atomized water from the atomizing nozzle 14b of the atomizing means 14 toward the cooling gas compressed by the air pressure source 15 and delivered through the filter 16 and the oxygen separation means 17, and fed into the cooling channel 20 of the forming mold 19 with the flow of the cooling gas. Thus, the cooling channel 20 of the forming mold 19 is fed with the agent, which is the rust-prevention agent and/or cleaner, so that the rust-prevention process and/or cleaning process of the wall of the cooling channel 20 is performed.

INDUSTRIAL APPLICABILITY

The present invention is applicable to a cooling technique for a mold, which is for injection molding, compression molding, extrusion molding, or the like.

The invention claimed is:

1. A method of cooling a forming mold provided with a cooling channel through which a refrigerant passes,
   wherein a feeding channel of the refrigerant to the cooling channel comprises an air pressure source, an oxygen separation membrane and an atomizing device including a nozzle and pump, and
   wherein the method comprises:
   pressure feeding an air to the feeding channel by means of the air pressure source;
   separating oxygen from the fed air and lowering a concentration of the air by means of the oxygen separation membrane; and
   atomizing a coolant liquid to the oxygen-concentration-lowered air and flowing them to the cooling channel,
   returning the oxygen separated from the air by the oxygen separation membrane to refrigerant exhausted from the cooling channel.

2. The method of cooling a forming mold set forth in claim 1, wherein the method further comprises:
   placing a forced exhaust device in the cooling channel, and
   exhausting forcedly the refrigerant in the cooling channel by means of the forced exhaust device.

3. A cooling system for a forming mold provided with a cooling channel through which a refrigerant passes, the cooling system comprising:
   an air pressure source for compressing a captured air and for delivering the compressed air to the cooling channel;
   an oxygen separation membrane to separate and eliminate oxygen from the compressed air delivered from the air pressure source and for lowering an oxygen concentration of the air; and
   an atomizing device to atomize a coolant liquid to the oxygen-concentration-lowered air
   wherein the cooling channel comprises an exhaust channel, provided with an oxygen returning channel to return the oxygen, separated from the air by the oxygen separation membrane, to refrigerant exhausted from the cooling channel.

4. The cooling system for a forming mold set forth in claim 3, further comprising:
   a forced exhaust device to forcibly exhaust the refrigerant in the cooling channel.

* * * * *